Dec. 18, 1945.  J. J. JACKMAN  2,391,020

MICROMETER GAUGE

Filed Sept. 30, 1943

INVENTOR
JOHN J. JACKMAN

BY Louis A. Kline

HIS ATTORNEY

Patented Dec. 18, 1945

2,391,020

UNITED STATES PATENT OFFICE 2,391,020

MICROMETER GAUGE

John J. Jackman, Dayton, Ohio

Application September 30, 1943, Serial No. 504,341

18 Claims. (Cl. 33—174)

This invention relates to a micrometer and in particular to a micrometer radius gauge for obtaining direct readings of the radii of arcuate surfaces.

When arcuate surfaces to be measured are a part of a shaped member and are less than a semicircle, difficulties arise in the accurate measurement of the radii which were used to form the arcs, because it is difficult to locate the centers and to use these centers in the making of any accurate measurement of the radii.

Applicant overcomes these difficulties by providing a novel measuring gauge which enables the radius of any arcuate surface on a member to be obtained directly from measurements made from the arcuate surface itself without requiring any previous location of the center in the member and without using the center to obtain the measurement.

The novel gauge contains three elements, which are located in a single plane and have surface-contacting portions which are capable of making point contacts on the arcuate surfaces. Two of these elements are positioned to include an angle of less than one hundred and eighty degrees between their longitudinal axes and are movable along the direction of their axes. The third element, also movable in the direction of its axis, is positioned between the other two elements, and its longitudinal axis bisects the angle included between the other elements. If the longitudinal axes of the three elements are extended, they will intersect at a point which may be considered as the center from which the three elements extend radially. As the elements move in the direction of their longitudinal axes, it will be seen, therefore, that they will move along radii extending from the center. If the surface-contacting portions of the elements are placed at the center or at equal distances from the center and the elements are moved equal extents along their longitudinal axes, then the contacting portions will move radially from the center and will always form points on an arc of a circle whose radius is equal to the amount of the displacement of any contacting portion from the center.

Indicating means are provided on the gauge to indicate the amount of displacement of the contacting portions from the center, and these means enable the direct reading of the length of the radius to be obtained.

In the operation of the gauge, the surface-contacting portions of the three elements are applied to the arcuate surface to be measured, and the elements are adjusted until the three contacting portions engage the arcuate surface. The reading on the gauge at this time will be the radius which has been used to form the arcuate surface.

In this manner, therefore, the measurement of the radius which has been used to form the arcuate surface on a member may be obtained directly from the surface itself without previously having located the center in the member and without using any center in the member in making the measurement.

With the novel gauge, the measurement of such radii may be made with the precision which may be obtained by using a micrometer.

It is an object of the invention to provide a measuring gauge for accurately measuring the radii used in forming arcuate surfaces on shaped members.

Another object of the invention is to provide means to measure the radius of an arcuate surface when the arcuate surface is less than a semicircle.

Another object of the invention is to provide a measuring gauge for measuring the radius used in forming an arcuate surface when the surface is less than a semicircle, which gauge is capable of obtaining the measurement from the arcuate surface itself.

Another object of the invention is to provide a measuring gauge for measuring the radius used in forming an arcuate surface on a member when the surface is less than a semicircle, which gauge is capable of obtaining the measurement directly from the surface without any previous location of the center in the member about which the arcuate surface was formed or the use of this center in the measurement.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

In the embodiment shown to illustrate the invention, the gauge is adapted to measure the radii of convex surfaces; however, it is not intended that the invention be limited to this form, as the gauge may equally well be arranged to measure the radii of concave arcuate surfaces, the principle of operation involved applying to the measurement of the radii of concave arcuate surfaces just as well as to the measurement of the radii of convex arcuate surfaces.

Figure 1:
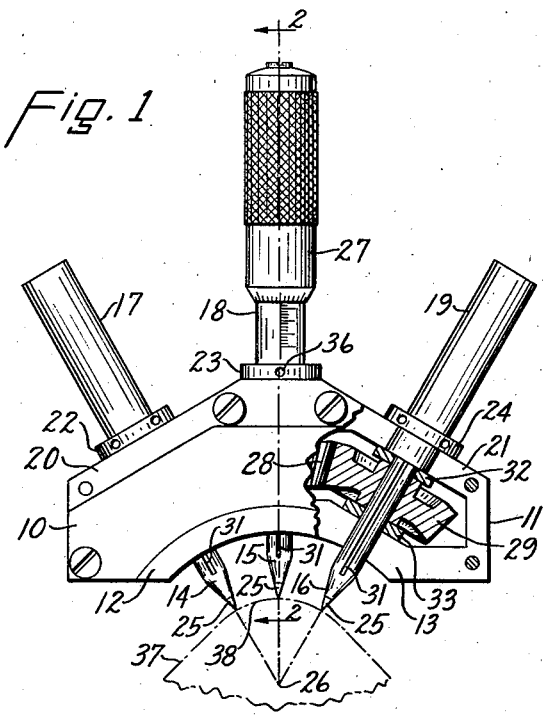
Fig. 1 is a front elevational view of the gauge with a portion of the front frame broken away to show the construction of other parts more clearly.
Figure 2:
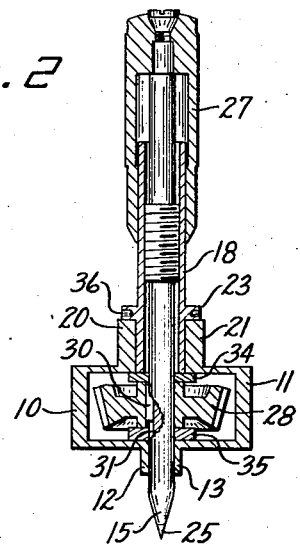
Fig. 2 is a section view taken along the line 2—2 in Fig. 1.

The novel gauge has a front frame 10 and a rear frame 11, which are secured together to support the various elements of the gauge in proper position. The inner portions 12 and 13 of the lower walls of the frames are recessed on their inner faces, as shown in Figs. 1 and 2, to provide bearings for the lower ends of three spindles 14, 15, and 16, which are rotatably supported by the frames 10 and 11. Adjacent their upper ends, the spindles are provided with threaded portions containing the usual micrometer threads of 40 threads to the inch (Fig. 2), and these threaded portions cooperate with similar internal threads in bushings or barrels 17, 18, and 19, which are held against movement in recesses formed in the inner faces of portions 20 and 21 of the upper walls of the front and back frame members 10 and 11 when the frames are secured together. As the spindles rotate in the barrels, the threaded ends thereon, cooperating with the internal threads of the barrels, will cause the spindles to move in or out of the frames a distance of .025 of an inch for each rotation of the spindles in a manner similar to that which occurs in the operation of the ordinary micrometer. The barrels 17, 18, and 19 are provided with flanges 22, 23, and 24, respectively, which engage the upper surface of the frame members to locate the barrels relatively thereto.

Referring to Fig. 1, it will be seen that the spindles 14 and 16 are mounted on either side of the central spindle 15 in such a manner that the angle between each of the spindles 14 and 16 and the central spindle 15 is the same; in other words, the central spindle bisects the angle included between the spindles 14 and 16.

For the best results, it has been found that the angle included between the spindles 14 and 16 should be greater than ten degrees and less than one hundred and eighty degrees.

The lower ends of the spindles are tapered and hardened to form hardened pointed surface-contacting portions, as 25. It is clear from Fig. 1 that, if these contacting portions are moved away from the frames along the longitudinal axes of the spindles, they will meet at the point 26, and that the longitudinal axes of the spindles will be radial about this point. If each of the spindles is withdrawn a like amount from this point, the contacting portions will always move along paths radial to the center and will lie along an arc of a circle whose center is at the point 26 and whose radius is equal to the distance the contacting portions have moved from the point 26.

The manner in which the spindles are moved and the means for indicating the extent of their movement will now be explained. As shown in Fig. 2, the central spindle extends through the top of the barrel 18 and has a thimble 27 secured thereto. The barrel 18 is marked with the usual micrometer subdivisions indicating twenty-five thousandths of an inch, and the thimble is provided with the usual twenty-five subdivisions to enable measurements of one thousandth to be obtained. The zero position of the spindle 15 is taken to be when the contacting portion 25 is at point 26, so that the amount of displacement of the contacting portion 25 between the zero point and the point when it engages the arcuate surface can be read directly on the barrel and thimble and provides a direct reading of the length of the radius.

In order that the rotation of spindle 15 can cause a like extent of rotation to be imparted to the spindles 14 and 16, the spindle 15 is provided with a gear 28, which meshes with similar gears, as 29, which are provided on the spindles 14 and 16. Each of the gears, as 28 and 29, is provided with a key, as 30 (Fig. 2), which extends into a slot, as 31, in its respective spindle. These connections between the gears and the spindles cause the gears to rotate with the spindles, but allow the spindles to move longitudinally through the gears. The gears, as 28 and 29, are located between the upper and lower walls of the front and back frames 10 and 11 and are kept from moving longitudinally with the spindles by means of suitable spacing collars, as 32, 33, 34, and 35, which maintain the gears in fixed relation to the upper and lower walls of the frames.

Due to the fact that the gearing will drive the spindles 14 and 16 in a reverse direction from that of spindle 15, the spindles 14 and 16 have threads which run in the reverse direction from those on spindle 15; for instance, if spindle 15 has a forty pitch right-hand thread, the spindles 14 and 16 will each be provided with forty pitch left-hand threads, so that, as the spindles are rotated, the contacting portions, as 25, will move together in the same direction toward or away from the frames a like amount.

While, in the embodiment of the invention shown herein, the rotation of the spindles and the reading of the measurements are obtained from a thimble on the center spindle 15, it is obvious that the thimble could equally well be applied to either the spindle 14 or the spindle 16, and the operation would be the same.

The instant embodiment is shown capable of measuring radii to thousandths of an inch; however, by the addition of a suitable vernier arrangement, as is well known in micrometers, these measurements may be made to a ten-thousandth of an inch.

Means is provided to enable the spindles to be adjusted longitudinally individually to insure that their contacting portions will all meet at the center and will always lie along the same arc. The flanges 22, 23, and 24 on the barrels are provided with holes, as 36, which may be engaged by a suitable spanner wrench. To adjust any spindle, the frames 10 and 11 are loosened slightly to release the barrel of that spindle for rotation within the recess, and the barrel is rotated by the wrench while the spindle is held against rotation. The relative movement between the barrel and the spindle, through their threaded engagement, will cause the spindle to move longitudinally to the correct position while the other spindles remain stationary.

The gauge shown herein to illustrate the invention is capable of measuring radii from 0 to approximately one inch; however, it is not intended that the invention be limited to this particular range, as the gauges may be made in larger sizes to measure radii in larger ranges, as, for instance, from one inch to two inches, two inches to three inches, etc.

The operation of the gauge is shown in Fig. 1. The work piece, shown schematically at 37, has an arcuate surface 38, which is less than a semicircle, and it is desired to measure the radius which was used to form the arcuate surface 38.

The gauge is applied to the arcuate surface, and the spindles are operated until the contacting portions 25 on all three spindles engage the arcuate surface 38 of the work piece 37, and, when this condition is obtained, the reading on the center barrel 18 and the thimble 27 will be the measurement of the radius which was used to form the arcuate surface 38. The measurement will have been taken from the arcuate surface 38 itself without locating the center in the work piece about which the arc was described and without making any point within the work piece a reference point from which the measurement was made.

While the form of the invention herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a micrometer gauge for measuring the radius of an arcuate surface, the combination of a supporting frame; three or more members mounted in the frame for movement relative thereto and having surface-contacting portions for engaging the arcuate surface whose radius is to be measured, said surface-contacting portions moving in paths which are radial to a center located outside the frame; and means for moving the members in unison so that the surface-contacting portions of all the members will simultaneously be positioned along their respective radial paths at points equidistant from said center and will form points on an arc whose radius is equal to the distance the surface-contacting portions have been displaced from said center, whereby, upon the members' being moved so that all the surface-contacting portions simultaneously engage the arcuate surface, their displacement from the center along any radial path will equal the radius of the arcuate surface.

2. In a micrometer gauge for measuring the radius of an arcuate surface by measurements taken along said surface at points within a semicircle, the combination of a supporting frame; three or more members mounted in the frame for movement relative thereto and having surface-contacting portions for engaging the arcuate surface whose radius is to be measured, said surface-contacting portions moving in paths which are radial to a center located outside the frame; means for moving the members in unison so that the surface-contacting portions of all the members will simultaneously be positioned along their respective radial paths at points equidistant from said center and will form points on an arc whose radius is equal to the distance the surface-contacting portions have been displaced from said center and whose length is less than a semi-circle; and means to indicate the distance the surface-contacting portions have been displaced from said center, thereby to provide a direct indication of the measurement of the required radius.

3. In a micrometer gauge for measuring the radius of a convex arcuate surface of an object, the combination of a supporting frame; three or more members mounted in the frame for movement relative thereto and having surface-contacting portions for engaging the arcuate surface whose radius is to be measured, said surface-contacting portions moving in paths which are radial to a center located outside the frame and within the outline of the object; means for moving the members in unison so that the surface-contacting portions of all the members will simultaneously be positioned along their respective radial paths to engage the arcuate surface at points which will be equidistant from said center and will form points on an arc whose radius is equal to the distance the surface-contacting portions are displaced from said center and whose length is less than a semi-circle; and means cooperating with a portion of the moving means to indicate the distance the surface-contacting portions have been displaced from said center when they engage the surface, thereby to provide a direct indication of the measurement of the radius of the arcuate surface described about the center which is within the outline of the object.

4. In a micrometer gauge for measuring the radius of an arcuate surface which is less than a semicircle, the combination of a supporting frame; two members mounted in the frame and movable along linear paths which intersect, the angle included between the paths being greater than ten degrees and less than one hundred and eighty degrees; a third member mounted in the frame in the same plane as the other two members and movable along a linear path which bisects the angle included between the paths of the other two members and passes through their point of intersection; a surface-engaging element on each of said members; and means for moving the members in unison so that the elements on the members will always be equidistant from the point of intersection, said elements when so positioned by the moving means always lying along the arc of a circle whose radius is equal to the distance any of the elements has been displaced from the point of intersection, whereby the radius of the arcuate surface can be measured by moving the elements until all the elements engage the arcuate surface whose radius is to be determined and then measuring the displacement of the elements from the point of intersection.

5. In a micrometer gauge for measuring the radius of an arcuate surface which is less than a semicircle, the combination of a supporting frame; two members mounted in the frame and movable along linear paths which intersect at a point outside of the support, the angle included between the paths being greater than ten degrees and less than one hundred and eighty degrees; a third member mounted in the frame in the same plane as the other two members and movable along a linear path which bisects the angle included between the paths of the other two members and passes through their point of intersection; a surface-engaging element on each of said members; means for moving the members in unison so that the elements on the members will always be equidistant from the point of intersection, said elements when so positioned by the moving means always lying along the arc of a circle whose radius is equal to the distance any of the elements has been displaced from the point of intersection and whose length is less than a semi-circle; and means to indicate the distance the elements have been displaced from the point of intersection thereby to provide a direct indication of the measurement of the required radius.

6. In a micrometer gauge for measuring the radius of an arcuate surface by measurements taken along an arc which is less than a semi-circle, the combination of a supporting frame; two members mounted in the frame and movable along linear paths which intersect at a point outside of the support, the angle included between the paths being greater than ten degrees and less than one hundred and eighty degrees; a third member mounted in the frame in the same plane as the other two members and movable along a linear path which bisects the angle included between the paths of the other two members and passes through their point of intersection; a surface-engaging element on each of said members; means for moving the members in unison so that the elements on the members will always be equidistant from the point of intersection, said elements when so positioned by the moving means always lying along the arc of a circle whose radius is equal to the distance any of the elements has been displaced from the point of intersection and whose length is less than a semicircle; and means cooperating with a portion of the moving means to indicate the distance the elements have been displaced from the point of intersection thereby to provide a direct indication of the measurement of the required radius.

7. In a micrometer gauge for directly measuring the radius of an arcuate surface, the combination of a housing means; three or more barrels secured to the housing means; three or more spindles each having one of its ends rotatably journaled in the housing and having micrometer threads near its other end, which threads cooperate with similar threads in one of the barrels, so that when the spindles are rotated they will be given micrometric longitudinal displacement relative to the housing and the barrels, the spindles and the barrels being so located on the housing means that the longitudinal axes of the spindles extend radially from a center located outside of the housing; surface-contacting portions on the spindles, the spindles being so adjusted longitudinally that the contacting portions on the spindles are all equidistant from the center; and means to rotate the spindles in unison to move the contacting portions of all the spindles equal distances toward and away from the center, whereby, upon the spindles' being rotated until their contacting portions engage the arcuate surface, their displacement from the center will be equal to the radius used to form the arcuate surface.

8. In a micrometer gauge for directly measuring the radius of an arcuate surface, the combination of a housing means; three or more barrels secured to the housing means; three or more spindles each having one of its ends rotatably journaled in the housing and having micrometer threads near its other end, which threads cooperate with similar threads in one of the barrels, so that when the spindles are rotated they will be given micrometric longitudinal displacement relative to the housing and the barrels, the spindles and the barrels being so located on the housing means that the longitudinal axes of the spindles extend radially from a center located outside of the housing; surface-contacting portions on the spindles, the spindles being so adjusted longitudinally that the contacting portions on the spindles are all equidistant from the center and will form points on an arc struck about the center with a radius equal to the distance between any of the contacting portions and the center; means to connect the spindles for similar extents of rotation; and a thimble encompassing one of the barrels and connected to the spindle in that barrel for rotating that spindle and, through the connections between spindles, imparting similar motion to the other spindles.

9. In a micrometer gauge for directly measuring the radius of an arcuate surface, the combination of a housing means; three or more barrels secured to the housing means; three or more spindles each having one of its ends rotatably journaled in the housing and having micrometer threads near its other end, which threads cooperate with similar threads in one of the barrels, so that when the spindles are rotated they will be given micrometric longitudinal displacement relative to the housing and the barrels, the spindles and the barrels being so located on the housing means that the longitudinal axes of the spindles extend radially from a center located outside of the housing; surface-contacting portions on the spindles, the spindles being so adjusted longitudinally that the contacting portions on the spindles are all equidistant from the center and will form points on an arc struck about the center with a radius equal to the distance between any of the contacting portions and the center; means to connect the spindles for similar extents of rotation; a thimble encompassing one of the barrels and connected to the spindle in that barrel for rotating that spindle and, through the connections between spindles, imparting similar motion to the other spindles; and cooperating means on the barrel encompassed by the thimble and on the thimble for providing an indication of the amount of displacement of the contacting portions from the center.

10. In a micrometer gauge for directly measuring the radius of an arcuate surface, the combination of a housing means; three or more barrels secured to the housing means; three or more spindles each having one of its ends rotatably journaled in the housing and having micrometer threads near its other end, which threads cooperate with similar threads in one of the barrels, so that when the spindles are rotated they will be given micrometric longitudinal displacement relative to the housing and the barrels, the spindles and the barrels being so located on the housing means that the longitudinal axes of the spindles extend radially from a center located outside of the housing; surface-contacting portions on the spindles, the spindles being so adjusted longitudinally that the contacting portions on the spindles are all equidistant from the center and will form points on an arc struck about the center with a radius equal to the distance between any of the contacting portions and the center; a gear keyed to each spindle for rotation therewith but so keyed to the spindle as to allow longitudinal movement of the spindle relative thereto, the gears on the spindles connecting the spindles for equal amounts of rotation; means cooperating with the gears and the housing means to maintain the gears in meshing relation and to prevent the gears from moving longitudinally with the spindles; and a thimble encompassing one of the barrels and connected to the spindle in that barrel for rotating that spindle and, through the gear connections between spindles, imparting similar motion to the other spindles.

11. In a micrometer gauge for directly measuring the radius of an arcuate surface, the combination of a housing means; three or more barrels secured to the housing means; three or more spindles each having one of its ends rotatably journaled in the housing and having micrometer threads near its other end, which threads cooperate with similar threads in one of the barrels, so that when the spindles are rotated they will be given micrometric longitudinal displacement relative to the housing and the barrels, the spindles and the barrels being so located on the housing means that the longitudinal axes of the spindles extend radially from a center located outside of the housing; surface-contacting portions on the spindles, the spindles being so adjusted longitudinally that the contacting portions on the spindles are all equidistant from the center and will form points on an arc struck about the center with a radius equal to the distance between any of the contacting portions and the center; a gear keyed to each spindle for rotation therewith but so keyed to the spindle as to allow longitudinal movement of the spindle relative thereto, the gears connecting the spindles for equal amounts of rotation; means cooperating with the gears and the housing means to maintain the gears in driving relation to each other and to prevent the gears from moving longitudinally with the spindles; a thimble encompassing one of the barrels and connected to the spindle in that barrel for rotating that spindle and, through the connections between spindles, imparting similar motion to the other spindles; and cooperating means on the barrel encompassed by the thimble and on the thimble for providing an indication of the amount of displacement of the contacting portions from the center.

12. In a micrometer gauge for measuring the radius of a convex arcuate surface of an object by measurements taken along an arc which is less than a semicircle, the combination of a housing means; three barrels secured to the housing means; three spindles, each spindle having one of its ends rotatably journaled in the housing means and having its other end journaled in one of the barrels and containing micrometer threads which cooperate with similar threads in the barrel so that, when the spindle rotates, it will be given a micrometric longitudinal displacement relative to the housing and the barrel, two of said spindles and barrels being so located in the housing means that the longitudinal axes of the spindles converge and intersect at a point outside the housing means and include an angle between 10 degrees and 180 degrees and the third spindle and barrel being so located in the housing means that the longitudinal axis of the third spindle lies in the same plane as the axes of the other two spindles and bisects the angle included between the longitudinal axes of the other two spindles; a surface-contacting portion on each spindle, the spindles being so adjusted longitudinally that the contacting portions on the spindles are all equidistant from the point at which their axes intersect and will form points on an arc formed about the point of intersection as a center and having radius equal to the distance between any contacting portion and the center; and means to rotate the spindles in unison to move the contacting portions of all the spindles equal distances toward or away from the point of intersection of their axes, whereby, upon the spindles' being rotated until their contacting portions engage the arcuate surface of the object, their displacement from the point of intersection of the longitudinal axes of their spindles will be equal to the radius used to form the arcuate surface.

13. In a micrometer gauge for measuring the radius of an arcuate surface by measurements taken along an arc which is less than a semicircle, the combination of a housing means; three barrels secured to the housing means; three spindles, each spindle having one of its ends rotatably journaled in the housing means and having its other end journaled in one of the barrels and containing micrometer threads which cooperate with similar threads in the barrel so that, when the spindle rotates, it will be given a micrometric longitudinal displacement relative to the housing and the barrel, two of said spindles and barrels being so located in the housing means that the longitudinal axes of the spindles converge and intersect at a point outside the housing means and include an angle greater than 10 degrees and less than 180 degrees and the third spindle and barrel being so located in the housing means that the longitudinal axis of the third spindle lies in the same plane as the axes of the other two spindles and bisects the angle included between the longitudinal axes of the other two spindles; a surface-contacting portion on each spindle, the spindles being so adjusted longitudinally that the contacting portions on the spindles are all equidistant from the point at which their axes intersect and will form points on an arc formed about the point of intersection as a center and having a radius equal to the distance between any contacting portion and the center; means to connect the spindles for similar extents of rotation; and a thimble encompassing one of the barrels and connected to the spindle in that barrel for rotating that spindle and, through the connections between the spindles, imparting similar motion to the other spindles.

14. In a micrometer gauge for measuring the radius of an arcuate surface which is less than a semicircle, the combination of a housing means; three barrels secured to the housing means; three spindles, each spindle having one of its ends rotatably journaled in the housing means and having its other end journaled in one of the barrels and containing micrometer threads which cooperate with similar threads in the barrel so that, when the spindle rotates, it will be given a micrometric longitudinal displacement relative to the housing and the barrel, two of said spindles and barrels being so located in the housing means that the longitudinal axes of the spindles converge and intersect at a point outside the housing means and the third spindle and barrel being so located in the housing means that the longitudinal axis of the third spindle lies in the same plane as the axes of the other two spindles and bisects the angle included between the longitudinal axes of the other two spindles; a surface-contacting portion on each spindle, the spindles being so adjusted longitudinally that the contacting portions on the spindles are all equidistant from the point at which their axes intersect and will form points on an arc formed about the point of intersection as a center and having a radius equal to the distance between any contacting portion and the center; means to connect the spindles for similar extents of rotation; a thimble encompassing one of the barrels and connected to the spindle in that barrel for rotating that spindle and, through the connections between the spindles, imparting similar motion to the other spindles; and cooperating means on the barrel encompassed by the thimble and on the thimble for providing an indication of the amount of displacement of the contacting portions from the point of intersection of the longitudinal axes of their spindles.

15. In a micrometer gauge for measuring the radius of an arcuate surface which is less than a semicircle, the combination of a housing means; three barrels secured to the housing means; three spindles, each spindle having one of its ends rotatably journaled in the housing means and having its other end journaled in one of the barrels and containing micrometric threads which cooperate with similar threads in the barrel so that, when the spindle rotates, it will be given a micrometric longitudinal displacement relative to the housing and the barrel, two of said spindles and barrels being so located in the housing means that the longitudinal axes of the spindles converge and intersect at a point outside the housing means and the third spindle and barrel being so located in the housing means that the longitudinal axis of the third spindle lies in the same plane as the axes of the other two spindles and bisects the angle included between the longitudinal axes of the other two spindles; a surface-contacting portion on each spindle, the spindles being so adjusted longitudinally that the contacting portions on the spindles are all equidistant from the point at which their axes intersect and will form points on an arc formed about the point of intersection as a center and having a radius equal to the distance between any contacting portion and the center; a gear keyed to each spindle for rotation therewith but so keyed to the spindle as to allow longitudinal movement of the spindle relative to the gear, the gears on the spindles connecting the spindles for equal amounts of rotation; means cooperating with the gears and the housing means to maintain the gears in meshing relation and to prevent the gears from moving longitudinally with the spindles; and a thimble encompassing one of the barrels and connected to the spindle in that barrel for rotating that spindle, and, through the gear connections between spindles, imparting similar motion to the other spindles.

16. In a micrometer gauge for measuring the radius of an arcuate surface which is less than a semicircle, the combination of a housing means; three barrels secured to the housing means; three spindles, each spindle having one of its ends rotatably journaled in the housing means and having its other end journaled in one of the barrels and containing micrometric threads which cooperate with similar threads in the barrel so that, when the spindle rotates, it will be given a micrometric longitudinal displacement relative to the housing and the barrel, two of said spindles and barrels being so located in the housing means that the longitudinal axes of the spindles converge and intersect at a point outside the housing means and the third spindle and barrel being so located in the housing means that the longitudinal axis of the third spindle lies in the same plane as the axes of the other two spindles and bisects the angle included between the longitudinal axes of the other two spindles; a surface-contacting portion on each spindle, the spindles being so adjusted longitudinally that the contacting portions on the spindles are all equidistant from the point at which their axes intersect and will form points on an arc formed about the point of intersection as a center and having a radius equal to the distance between any contacting portion and the center; a gear keyed to each spindle for rotation therewith but so keyed to the spindle as to allow longitudinal movement of the spindle relative to the gear, the gears on the spindles connecting the spindles for equal amounts of rotation; means cooperating with the gears and the housing means to maintain the gears in meshing relation and to prevent the gears from moving longitudinally with the spindles; a thimble encompassing one of the barrels and connected to the spindle in that barrel for rotating that spindle, and, through the gear connections between spindles, imparting similar motion to the other spindles; and cooperating means on the barrel encompassed by the thimble and on the thimble for providing an indication of the amount of displacement of the contacting portions from the point of intersection of the longitudinal axes of their spindles.

17. In a micrometer gauge for directly measuring the radius of an arcuate surface, the combination of a housing means; three or more barrels releasably secured to the housing means; three or more spindles each having one of its ends rotatably journaled in the housing and having micrometer threads near its other end, which threads cooperate with similar threads in one of the barrels, so that when the spindles are rotated they will be given micrometric longitudinal displacement relative to the housing and the barrels, the spindles and the barrels being so located on the housing means that the longitudinal axes of the spindles extend radially from a center located outside of the housing; surface-contacting portions on the spindles, the spindles being so adjusted longitudinally that the contacting portions on the spindles are all equidistant from the center; means on the barrels for rotating any barrel when that barrel is released from the housing means, to enable the barrel to be rotated while the spindles are held stationary to thereby provide for the longitudinal adjustment of any of the spindles so that the surface-contacting portion of all the spindles can be adjusted to be equidistant from the center; and means to rotate the spindles in unison to move the contacting portions of all the spindles equal distances toward and away from the center, whereby, upon the spindles' being rotated until their contacting portions engage the arcuate surface, their displacement from the center will be equal to the radius used to form the arcuate surface.

18. In a micrometer gauge for measuring the radius of an arcuate surface which is less than a semicircle, the combination of a housing means; three barrels releasably secured to the housing means; three spindles, each spindle having one of its ends rotatably journaled in the housing means and having its other end journaled in one of the barrels and containing micrometer threads which cooperate with similar threads in the barrel so that, when the spindle rotates, it will be given a micrometric longitudinal displacement relative to the housing and the barrel, two of said spindles and barrels being so located in the housing means that the longitudinal axes of the spindles converge and intersect at a point outside the housing means and the third spindle and barrel being so located in the housing means that the longitudinal axis of the third spindle lies in the same plane as the axes of the other two spindles and bisects the angle included between the longitudinal axes of the other two spindles; a surface-contacting portion on each spindle, the spindles being so adjusted longitudinally that the contacting portions on the spindles are all equidistant from the point at which their axes intersect and will form points on an arc formed about the point of intersection as a center and having a radius equal to the distance between any contacting portion and the center;

means on the barrels for rotating any barrel, when that barrel is released from the housing means, to enable the barrel to be rotated while the spindles are held stationary to thereby provide for the longitudinal adjustment of any of the spindles relative to the others so that the surface-contacting portions of all the spindles can be adjusted to be equidistant from the point of intersection of their axes; and means to rotate the spindles in unison to move the contacting portions of all the spindles equal distances toward or away from the point of intersection of their axes, whereby, upon the spindles' being rotated until their contacting portions engage the arcuate surface, their displacement from the point of intersection of the longitudinal axes of their spindles will be equal to the radius used to form the arcuate surface.

JOHN J. JACKMAN.